March 7, 1933.     W. T. CLARK     1,900,097
RAIN AND SUN SHIELD FOR VEHICLES
Filed Aug. 19, 1929
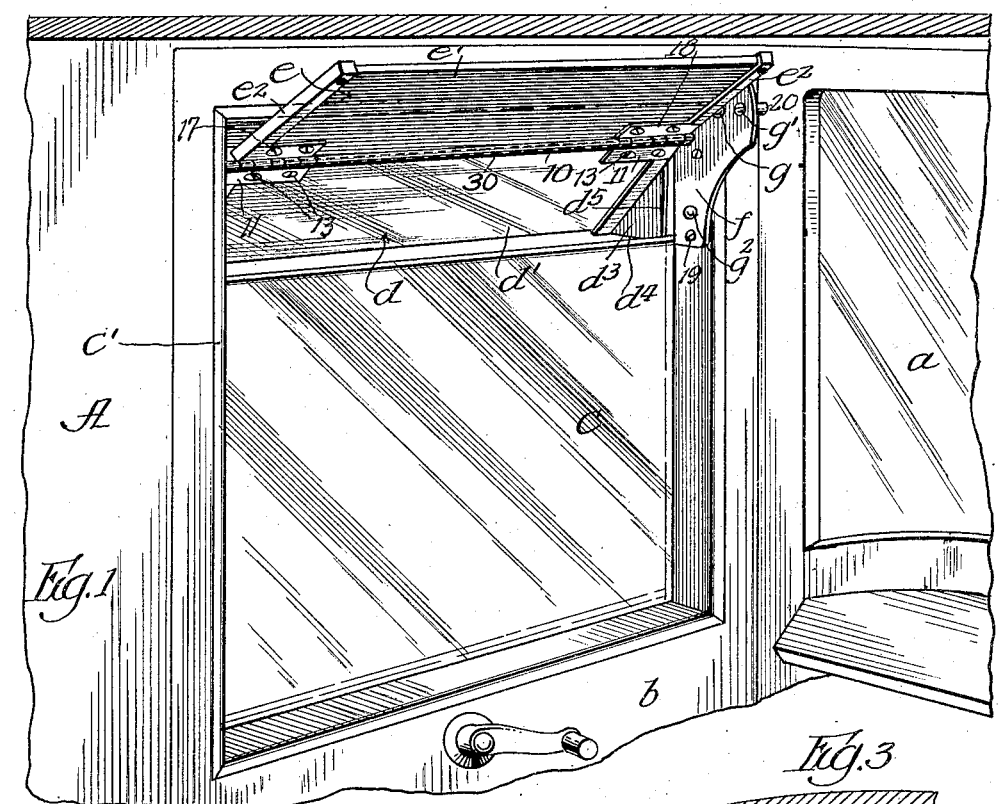
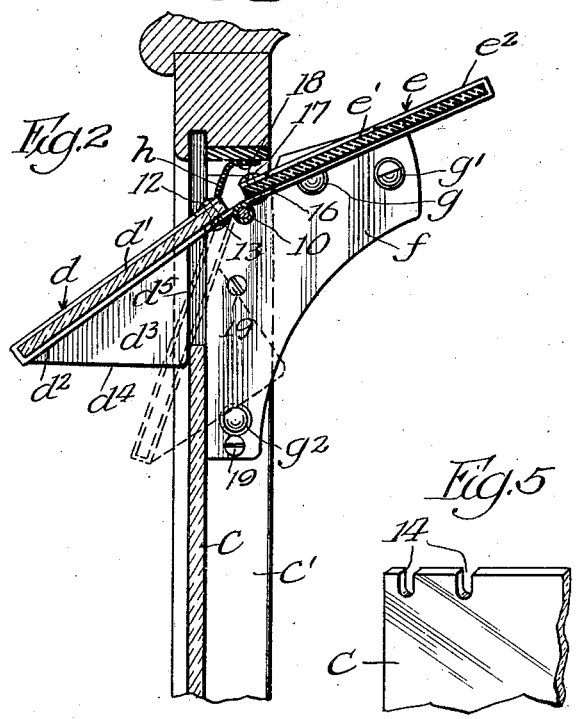
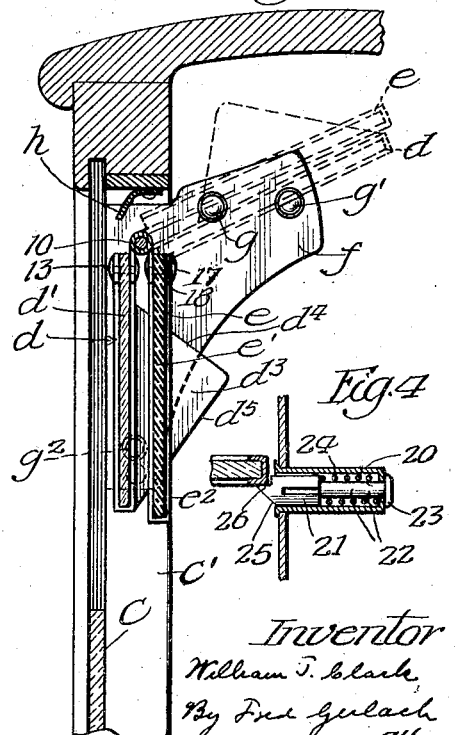

Patented Mar. 7, 1933

1,900,097

UNITED STATES PATENT OFFICE

WILLIAM T. CLARK, OF BOSTON, MASSACHUSETTS

RAIN AND SUN SHIELD FOR VEHICLES

Application filed August 19, 1929. Serial No. 386,768.

The invention relates to rain and sun shields for vehicles.

One object of the invention is to provide an improved sun shield which is adapted to be conveniently manipulated into and out of its operative position adjacent the upper end of the window in the vehicle.

Another object of the invention is to provide a rain shield which is adapted to be shifted into and out of its operative position through a window opening of the vehicle.

A still further object of the invention is to provide combined rain and sun shields which can be easily manipulated into and out of operative position.

Other objects of the invention will appear from the detailed description.

The invention consists in the several novel features hereinafter set forth and more particularly defined by claims at the conclusion hereof.

In the drawing: Fig. 1 is a portion of a vehicle equipped with the invention. Fig. 2 is a vertical section illustrating the rain shield in its operative position and the sun shield in its inoperative position. Fig. 3 is a section illustrating the sun shield in its operative position. Fig. 4 is a detail section of one of the catches for holding the shields. Fig. 5 is a detail of one of the shield plates.

The invention is exemplified in the closed body A of an automobile, which is provided with a front windshield $a$ and a front door $b$ which is hinged so it may be swung open or closed, as well understood in the art, and is provided with a vertically slidable glass plate $c$ for closing the rectangular frame opening $c'$ in the door. The window $c$ consists of a frameless glass plate which is adapted to slide in grooves in the window frame in the door, as well understood in the art, so the opening $c'$ may be opened or closed as desired.

A rod 10 extends across the opening $c'$ inwardly of the glass window plate $c$ and is fixedly secured in the window or door frame to pivotally support a rain shield $d$ and a sun shield $e$. The rain shield $d$ comprises a clear glass plate $d'$, the ends of which are set and fixed into channel bars $d^2$ to protect the edges of said glass plate. The upper margin of the rain shield $d$ is pivotally connected to and supported by the rod 10 by means of hinge plates 11 which extend around the rod and are secured to the shield $d$ by screws 13 and clamping plates 12. The screws 13 extend through notches 14 which are ground in the upper margins of the glass plate $d'$ to avoid possible breakage of said plate in drilling. The sun shield or visor $e$ comprises a plate $e'$ of green or other glass which is adapted to interrupt the infra-red rays of the sun and prevent them from passing therethrough. The ends of plate $e'$ are set in channel bars $e^2$ to protect the end edges thereof. The upper end of the sun shield $e$ is also pivotally connected to and supported by the rod 10 by means of hinges 16 which are clamped to said plate by screw 17 and clamping plates 18. Screws 17 also pass through notches 14 formed in the adjacent end of the plate $e'$. The hinges 11, 16 between the plates $d'$ and $e'$ and rod 10 are formed so that said plates may be swung into substantially parallel and close relation. Rod 10 is disposed adjacent the upper end of the window opening $c'$ and inwardly of the window plate $c$, so that when the shields $d$ and $e$ are swung into the body of the vehicle, the window $c$ may be completely closed. A bracket $f$, preferably formed of a plate of sheet metal, is secured by screws 19 to one side of the window frame to carry devices $g$, $g'$ for retaining the shields $d$, $e$ in different positions. Each of the devices $g$, $g'$ comprises a socket 20 riveted or otherwise secured in the bracket $f$, a button or plunger 21, slidable in the socket 20 and held therein by a stem 22 which has a shoulder 23 to engage the inner end of said socket, and a spring 24. The projecting end of plunger 21 is inclined, as at 25, below a shoulder 26 which is adapted to serve as a rest for one of the shields $d$, $e$. To release the shield $d$ or $e$, the operator will push the plunger 21 inwardly to permit the particular shield to be lowered. In retracting the shield $d$ or $e$, the channel bar $d^2$ or $e^2$ thereon will engage the inclined face 25 and force the plunger 21 inwardly until said shield has been lifted sufficiently to permit the spring 24 to project the plunger 21 into its operative position. This exemplifies a releasable retaining device, and one of these designated $g$ is provided in the bracket $f$ and positioned to retain the sun shield $e$ in its inoperative position adjacent the roof of the vehicle body, while a similar retaining device designated $g'$ is secured in bracket $f$ to support the rain shield $d$ in its inoperative position inside of the vehicle body and adjacent its roof.

When the use of the shields $d$, $e$ is not desired, they will be swung into their lifted position, as indicated by dotted lines in Fig. 3. At such time, the end bar $d^2$ of the shield $d$ will rest on the plunger 21 of retaining device $g'$, and the bar $e^2$ of the sun shield $e$ will rest upon the end bar $d^2$ so that both of the shields $d$, $e$ will be retained inside of the vehicle body and adjacent its roof. All portions of the shields and the rod 10 will then be disposed inside of the vehicle body so that the window $c$ may be opened or closed as desired.

A cam plate $d^3$ is secured to the channel bar $d^2$ of shield $d$ adjacent bracket $f$. A spring-pressed retaining device $g^2$, similar in construction to the devices $g$ and $g'$, excepting that the front end of the plunger 21 thereof may be rounded instead of shouldered and inclined, is secured in the lower portion of bracket $f$, and the cam plate $d^3$ is adapted to rest on the plunger 21 of the retaining device $g^2$, to hold the rain shield $d$ in the position shown by dotted lines in Fig. 2, which is approximately the position necessary to prevent any rain from entering the inside of the vehicle when it is being operated at high speed. If it is desired to reduce the ventilation while keeping the rain shield $d$ operative, the window $c$ may be raised so it will engage the cam edge $d^4$ so the shield $d$ will be swung outwardly into the position shown in full lines in Fig. 2, and until the vertical edge $d^5$ of the cam plate $d^3$ engages the window plate $c$ so that the shield $d$ will be retained in said position by the window plate. In this connection it will be apparent that the cam piece $d^3$ operates as a guard to prevent entry of rain at the forward end of the shield $d$, as well as a wind break so that ventilation is had without the creation of drafts within the vehicle body. The shield $d$ may also be manipulated into intermediate position by means of the window plate $c$. When the operator lowers the window-plate $c$ for observation or signalling purposes, said window plate, when it is again lifted, will restore the shield $d$ to its desired position through the engagement of the window plate $c$ with the cam plate $d$. When it is desired to protect the operator from the sun's rays, while the window $c$ is closed, both of the shields $d$, $e$ will be swung into approximately vertical position, as indicated by full lines in Fig. 3, at which time the sun-shield or visor $e$ will be positioned inwardly of the clear vision plate $d'$. When it is desired to ventilate the car through window opening $c'$ while the use of the sun-shield $e$ is necessary, the window $c$ may be lowered to admit air under the shields $d$, $e$.

A sealing strip $h$ is secured to the top of the window frame $c'$ to engage the upper end of the rain shield $d$ to prevent rain from entering the vehicle body between the upper end of the rain shield $d$ and the window frame $c'$. A sleeve 30 is provided around rod 10 to space the hinges 11, 18 from each other.

A characteristic of providing a rigid plate of green or other suitable glass to serve as the sun shield $e$ is that said plate may be sufficiently transparent so that it will not obstruct the vision of the operator because a glass plate of this character permits the traffic or other objects to be seen by the operator therethrough.

The invention exemplifies improved rain and sun shields $d$, $e$ which are adapted to be conveniently manipulated into and out of their operative positions and are usable in connection with the slidable window plate $c$ in the vehicle so that the rain shield $d$ may be held operative while the window is open to ventilate the car, and so that the sun shield $e$ may be rendered operative either while the window is closed or open to ventilate the car. The invention also exemplifies shields $d$, $e$ for this purpose which can be conveniently operated and are simple in construction.

The invention is not to be understood as restricted to the details set forth, since these may be modified within the scope of the appended claims, without departing from the spirit and scope of said invention.

Having thus described the invention, what I claim as new and desire to secure by Letters Patent, is:

1. The combination with the vertically sliding glass of a vehicle window, of a shield plate pivoted inside the vehicle proximate the top of the window frame and adapted to be swung outward through the window opening with provision of a vent regulatable by adjustment of the sliding glass, and windbreak means on the shield plate coacting with the sliding glass for holding said shield plate in different positions.

2. The combination with the vertically sliding glass of a vehicle window, of a pair of shield plates one of which includes a windbreak means at the forward end, both of the plates being pivoted by a common support located inside and proximate the top of the window frame for capacity to be swung upward within the vehicle body to a position out of the way when not needed, and said plate with the wind-break means being movable outward through the window opening into active position with formation of a vent regulatable by adjustment of said sliding glass.

3. The combination with the vertically sliding glass of a vehicle window, of a clear vision rain shield comprising a glass plate with a wind-break element at its forward end and a sun shield comprising a translucent glass plate, both of said plates being pivoted by a common support located inside and proximate the top of the window frame to swing into raised position out of the way within the vehicle body when not needed, and the rain shield being movable outward through the window opening with provision of a vent regulatable by adjustment of said sliding glass.

4. The combination with the vertically sliding glass of a vehicle window, of a plurality of shield plates co-axially pivoted by a common support located inside and proximate the top of the window frame so as to be swingable into raised position out of the way within the vehicle body when not needed; one of said shield plates having a wind-break means at its forward end and being movable outward through the window opening with provision of a vent regulatable by adjustment of the sliding sash, and the other movable into an approximately vertical position to serve as a sunlight condenser.

5. The combination with the vertically sliding glass of a vehicle window; of a shield plate pivoted to swing outward through the window opening, and a cam-like guard-element at one end of said plate engageable by the sliding glass to shift and hold the shield plate in different positions outside of the window.

6. The combination with the vertically sliding glass of a vehicle window, of a shield plate pivoted inside of and proximate the top of the window frame for capacity to be swung outward through the window opening, said plate having at one end a cam-like guard-element engageable with the sliding glass to shift and hold it in different positions outside of the window, and spring-influenced plunger-catch means for holding the shield plate in raised position out of the way inside of the vehicle when not needed.

7. The combination with the vertically sliding glass of a vehicle window; of a pivot rod extending across the inside and rigidly secured proximate the top of the window frame, a shield plate of glass with notches along one of its edges, and hinge members on said rod clamped to said shield plate by screws passing through the notches.

8. The combination with the vertically slidable glass of a vehicle window, of a shield plate pivoted inside and proximate the top of the window frame for capacity to be swung outward through the window opening, with provision of a vent regulatable by adjustment of the window sash, said shield plate having at its forward end a cam-like guard co-active with the slidable glass in positioning the shield and serviceable also as a wind break as well as a means to preclude entry of rain at that point.

Signed at Boston, Massachusetts, this 3 day of July, 1929.

WILLIAM T. CLARK.